United States Patent [19]
Nakajo

[11] 3,860,440
[45] Jan. 14, 1975

[54] METHOD OF MANUFACTURING A HIGHLY GLOSSY SHEET MATERIAL

[75] Inventor: Shogo Nakajo, Nishinomiya City, Japan

[73] Assignee: Kurashiki Rayon Co., Ltd., Sakazu, Kurashiki, Japan

[22] Filed: Mar. 26, 1973

[21] Appl. No.: 344,924

Related U.S. Application Data

[63] Continuation of Ser. No. 737,852, June 18, 1968, abandoned.

[30] Foreign Application Priority Data

June 30, 1967 Japan.............................. 42-42707

[52] U.S. Cl.......... 117/64 R, 117/119.6, 117/135.5, 117/161 KP, 260/2.5 AY
[51] Int. Cl............................. B32b 5/18, B44d 1/14
[58] Field of Search..... 117/135.5, 6, 64 R, 161 KP, 117/119.6, DIG. 7; 260/2.5 AY

[56] References Cited
UNITED STATES PATENTS

| | | | |
|---|---|---|---|
| 2,417,009 | 3/1947 | Miller | 117/64 |
| 2,714,571 | 8/1955 | Irion | 117/140 |
| 2,729,618 | 1/1956 | Muller | 260/75 |
| 3,009,209 | 11/1961 | Weinbrenner | 161/190 |
| 3,015,650 | 1/1962 | Schollenberger | 260/75 |
| 3,061,475 | 10/1961 | Wallace | 161/190 |
| 3,078,179 | 2/1963 | Kuan | 117/140 |
| 3,218,212 | 11/1965 | Underwood | 117/64 |
| 3,255,061 | 6/1966 | Dobbs | 161/190 |
| 3,274,322 | 9/1966 | Scudder | 117/161 |
| 3,418,188 | 12/1968 | Hogg et al. | 161/190 |
| 3,429,729 | 2/1969 | McCarthy | 117/64 |

Primary Examiner—William D. Martin
Assistant Examiner—William R. Trenor
Attorney, Agent, or Firm—Stevens, Davis, Miller & Mosher

[57] ABSTRACT

Highly glossy sheet material is manufactured by applying a layer of polymer solution to a sufficiently smooth surface warmed at a suitable temperature, superimposing a substrate having a relatively smooth surface onto the layer of said polymer solution before it loses fluidity and it is not solidified, coagulating substantially the layer of said polymer solution sandwiched between said sufficiently smooth surface and said substrate by removing solvent from the layer of said polymer solution through the substrate, and thereafter peeling off said substrate to which the coagulated polymer layer is adhered from said sufficiently smooth surface.

12 Claims, No Drawings

METHOD OF MANUFACTURING A HIGHLY GLOSSY SHEET MATERIAL

This is a continuation, of application Ser. No. 737,852, filed June 18, 1968, now abandoned.

This invention relates to a method of manufacturing a highly glossy sheet material.

Principal object of this invention is to provide a method of manufacturing a highly glossy sheet material using polymer, especially, polyurethane elastomer.

The method of this invention comprises: (a) applying a layer of polymer solution to a sufficiently smooth surface warmed to a suitable temperature, (b) superimposing a substrate having a smooth surface onto the layer of said polymer solution before it loses fluidity and is not solidified, (c) coagulating substantially the layer of the polymer solution sandwiched between said sufficiently smooth surface and said substrate by removing solvent from the layer of the polymer solution through the substrate, and thereafter, (d) peeling off said substrate to which the coagulated polymer layer is adhered from said sufficiently smooth surface.

Any flexible polymer may be used as the polymer to be used in the step (a), and in particular polyurethane elastomer and polyurethane elastomer blended with less than 50% of other polymer, (for instance, polyvinyl chloride) are preferred.

As to the solvent to be used in the step (a), any solvent which is capable of dissolving the polymer, for example, dimethylformamide, dimethylacetoamide, dimethylsulfoxide, tetrahydrofuran, dioxane and their mixtures may be used. A solvent which has suitable boiling point may be used solely. Furthermore, in order to give the solvent a vaporizing rate within the desired range, a mixture of solvents having different boiling points may also be used. In this case the use of large amount of solvents having a very high hygroscopicity or having a boiling point too low should be avoided. The former causes the resulting layer of polymer to lose its transparency and the latter causes it to foam.

As to the sufficiently smooth surface, many kinds of surfaces can be used. A roll with a sufficiently smooth surface (highly polished roll) is effective in putting this invention into practice. Belts with a sufficiently smooth surface may also be used.

The temperature of the sufficiently smooth surface is varied according to the boiling points of solvents to be used. That is, if the boiling point of a solvent is high, the temperature of the sufficiently smooth surface should be high, if the boiling point of solvent is low, the temperature of the surface should be low. However, the temperature of the sufficiently smooth surface may be set within the desired temperature range and the kind of solvents or their composition may be suitably selected according to the temperature of the surface. Thus, by suitable selection of solvents, the temperature of the sufficiently smooth surface may be widely varied. Ordinarily, the temperature range of 40° – 85°C is considered optimum.

The concentration and viscosity of polymer solution used in the step (a) are preferably 10 to 25 weight percent and 1 to 30 poises (at 40°C) respectively. If the concentration is too low, long time is required for removing solvents; besides, the transparency of the polymer layer is apt to be easily lost and they easily foam. On the other hand, if the concentration is too high, the layer of polymer solution solidifies so quickly that it will be difficult to form a uniform layer and its adhesion with the substrate will also be inferior. When the viscosity of polymer solutions is too low, it is difficult to coat it onto the sufficiently smooth surface, and, if its viscosity is too high, it is difficult to coat it uniformly, and its adhesion with the substrate will be also inferior.

As to the thickness of the layer of polymer solution in the step (a), it is preferable that the layer of solution is thick enough so that the resulting layer has a thickness of 10 to 50 micron.

There is no need to add additives in the polymer solution. But it is possible that many kinds of additives such as pigments and plasticizers may be added in the polymer solution.

When substrate with a smooth surface is superimposed onto the layer of polymer solution in the step (b), it is essential that the layer of polymer solution on the sufficiently smooth surface is in wet condition, otherwise the resulting layer of the polymer is not sufficiently adhered to the substrate when the solvent is removed from the layer of polymer solution. Therefore, it is important in this invention that the substrate is superimposed onto the layer of polymer solution before it is half dried, its concentration and viscosity preferably being in the range of 30 to 40% and 50 to 100 poises respectively.

In the step (b), it is preferable that substrate with smooth surface is heated from its back.

The first object of this procedure in the step (b) is to prevent the coagulated layer of polymers from losing its transparency and to give it sufficiently glossy finish; that is, if the solvents are evaporated by warming only the sufficiently smooth surface without heating from the back, it takes an unnecessarily long time to coagulate the layer of solution owing to the slow evaporation of solvent and solvent is not completely removed. And if the substrate is peeled off from the sufficiently smooth surface while still containing the solvent, the resulting layer of polymer will lose its transparency due to the solvent contained. On the contrary, if heating is applied to both sides, the evaporation of solvents through the back of the substrate is accelerated and the loss of transparency can be prevented.

The second object of this heating from the back is to prevent foam in the resulting layer of polymer: that is, if the solvents are evaporated by warming only smooth surfaces, solvents are not only removed through the back but also spout into the boundary between the substrate and the sufficiently smooth surface. Thus, foaming occurs easily in the polymer layer. On the contrary, if heating is applied to both sides, the evaporation of solvents from the back of the substrate is accelerated and in this way foaming is prevented.

The third object of this heating is to prevent the degradation of the pliability of the product; that is, if the solvents are evaporated by warming only the sufficiently smooth surfaces, it takes a long time to evaporate solvents, therefore, the time while solvents pass through the substrate becomes long; in this way, the substrate is swollen and thereafter is shrunk and thus the density and the degradation of the pliability are increased in products. On the contrary, when heating is applied to both sides, solvents pass through the substrate in short time, therefore, the swelling of the substrate does not so easily occur and the degradation of the pliability is reduced.

Hot air or electric heaters are adopted as heating means in this process.

As to the temperature and velocity of hot air, 60° to 180°C and 0.5 to 20 m/sec are preferably used, respectively.

But the range of 90° to 120°C and 1 to 10 m/sec are optimum.

It is essential for the production of end products to get good qualities that the substrate to be superimposed on the layer of polymer solution has relatively smooth surface. It is possible to give gloss to products even if the substrate has not a completely smooth surface. But, it is impossible to give gloss to a considerably rough surface and this is the cause of the inferiority in the appearance of end products.

The substrate must be gas-permeable and moisture-permeable, otherwise solvents cannot be removed from the back of the substrate.

The sheet materials consisting of fibrous base substances and polymer films are suitable as substrate, especially ones treated by painting and embossing are more suitable.

This invention will be further illustrated by the following examples. Parts and percentages mean by weight unless otherwise specified.

EXAMPLE 1

A polymer solution consisting of 15 parts of polyurethane elastomer, 15 parts of paste containing 5 percent of pigments and 70 parts of tetrahydrofuran was prepared and the viscosity of this polymer solution was adjusted to 8 poises at 40°C. The polymer solution was applied at a rate of 250 g/m² on the highly polished roll rotating at a superficial velocity of 1 m/min. and kept at 40°C. Then, a substrate consisting of fibrous base material and polymer film was superimposed thereon; solvent involved in polymer solution was vaporized through the sheet material and the polymer solution was coagulated on the same roll for a period of 130 seconds with heating by means of blowing hot air at 110°C and at a flow velocity of 8 m/sec to the back of sheet material. After this step, highly glossy and durable sheet material was gained by peeling it off from the roll.

EXAMPLE 2

A polymer solution consisting of 15 parts of polyurethane elastomer, 15 parts of paste containing 5 percent of pigments and 70 parts of tetrahydrofuran was prepared, and the viscosity of this polymer solution was adjusted to 8 poises at 40°C. The polymer solution was applied at a rate of 250 g/m² on a mirrored roll rotating at a superficial velocity of 1 m/min. and kept at 40°C. Then, this polymer solution was semi-coagulated during stay for 50 seconds on the mirrored roll, and in this time, a substrate with a smooth surface was superimposed on the polymer solution. The polymer solution was coagulated, and then the substrate was peeled off from the roll.

What is claimed is:

1. A method of manufacturing highly glossy sheet material which comprises:
   a. applying a layer of polymer solution comprising a polyurethane elastomer and a solvent therefor to a highly smooth-surfaced body kept at a temperature of about 40°–85°C, to evaporate the solvent from the polymer solution,
   b. superimposing a substrate which has a substantially smooth surface and is permeable to gas and vapor onto the layer of said polymer solution before said layer is coagulated,
   c. substantially coagulating said layer of said polymer solution sandwiched between said body and said substrate by removing the solvent from the layer of said polymer solution through the substrate, and
   d. peeling off said substrate to which the coagulated polymer is adhered from said body.

2. A method according to claim 1, wherein the smooth-surfaced body is a roll.

3. A method according to claim 1, wherein the concentration of the polymer solution applied to the smooth-surfaced body is in the range of about 10 – 25 weight percent.

4. A method according to claim 1, wherein the viscosity of the polymer solution applied to the smooth-surfaced body is 1 to 30 poises at 40°C.

5. A method according to claim 1, wherein the substrate is superimposed when the concentration of the polymer solution is in the range of about 30 to 40 weight percent.

6. A method according to claim 1, wherein the substrate is superimposed when the viscosity of the polymer solution is in the range of about 50 to 100 poises at 40°C.

7. A method according to claim 1 in which heat is applied at step (c) from the side of the substrate which is not contacted with the layer of said polymer solution.

8. A method according to claim 7, wherein heat is applied from the back of the substrate by hot air.

9. A method according to claim 7, wherein heat is applied from the back of the substrate by electric heaters.

10. A method according to claim 1, wherein the polymer in the polymer solution is a polyurethane elastomer blended with less than 50% of another polymer.

11. A method according to claim 10, wherein said another polymer is polyvinyl chloride.

12. A method according to claim 1, in which said solvent is selected from the group consisting of dimethylformamide, dimethylacetoamide, dimethylsulfoxide, tetrahydrofuran, dioxane and mixtures thereof.

* * * * *